(12) United States Patent
Ziemer

(10) Patent No.: US 6,535,035 B2
(45) Date of Patent: Mar. 18, 2003

(54) DRIVER AND METHOD FOR SWITCHING APPLICATIONS

(75) Inventor: Kevin W. Ziemer, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/003,772

(22) Filed: Nov. 15, 2001

(65) Prior Publication Data

US 2002/0060589 A1 May 23, 2002

Related U.S. Application Data

(60) Provisional application No. 60/249,557, filed on Nov. 17, 2000.

(51) Int. Cl.$^7$ ................................................. H03K 5/12
(52) U.S. Cl. ........................................ 327/108; 327/112
(58) Field of Search ................................ 327/170, 112; 326/26, 27, 87

(56) References Cited

U.S. PATENT DOCUMENTS

| | | | | |
|---|---|---|---|---|
| 5,568,081 A | * | 10/1996 | Lui et al. | 327/170 |
| 5,623,221 A | * | 4/1997 | Miyake | 326/27 |
| 5,939,909 A | * | 8/1999 | Callahan, Jr. | 327/170 |
| 6,020,699 A | | 2/2000 | Maggio et al. | 318/254 |
| 6,069,509 A | * | 5/2000 | Labram | 327/170 |
| 6,084,378 A | | 7/2000 | Carobolante | 318/811 |
| 6,222,403 B1 | * | 4/2001 | Mitsuda | 327/170 |

* cited by examiner

Primary Examiner—Toan Tran
(74) Attorney, Agent, or Firm—W. Daniel Swayze, Jr.; W. James Brady; Frederick J. Telecky, Jr.

(57) ABSTRACT

A predriver receives control information and provides an output signal for implementing control of an associated power switch device. The control information triggers a change in the output signal, such as from a first generally stable level to a second generally stable level. During the change in the output signal, the predriver operates in at least two transitional modes to control the output signal. The different transitional modes, for example, cause the output signal of the predriver to change at different rates. An associated pair of high side and low side predrivers further can be implemented in combination with a set of respective high side and low side power switches so as to form a driver.

33 Claims, 10 Drawing Sheets

DRIVER AND METHOD FOR SWITCHING APPLICATIONS

The present application claims the benefit of U.S. Provisional Patent Application Ser. No. 60/249,557, which was filed Nov. 17, 2000, and entitled POWER DRIVER FOR SWITCHING APPLICATIONS, and which is incorporated herein by reference.

TECHNICAL FIELD

The present invention relates generally to control of switching devices and, more particularly, to a driver and method to implement desired switching controls.

BACKGROUND OF THE INVENTION

Driving a load between alternating high and low voltages can be employed to control electrical current in that load. This is often referred to Pulse Width Modulation (PWM). Usually, a PWM scheme utilizes two power switches coupled across a load. The switches are selectively activated from high to low conditions or from low to high conditions, taking precautions against having both switches fully ON at the same time.

Various power applications can employ a PWM scheme to provide desired current and/or voltage control to an associated load. One particular application relates to a spindle motor, such as is employed to rotate information platters, such as hard disk drives, CD-ROM drives, video tape recorders, etc. A three-phase dc motor is a common type of spindle motor, which, for example, has current energizing respective coils using a full wave bridge configuration. The bridge includes six power stages, with respective pairs of such stages being associated with each phase of the motor. Thus, one stage of each pair of stages and associated power devices are connected between the motor coil and ground, usually referred to as "low side" stages. The other stage of each pair of stages and their power devices are referred to as "high side" stages and devices because they are connected between the power supply and the motor coil.

The power devices are operated as switches in a sequence that allows pulses of current to flow from the power supply through a high-side power device, a coil of the first of the three stages, a coil of the second of the three stages, and then through a low-side power device to ground. This process is repeated in a generally well-known manner for the other power devices and coil pairs to achieve three-phase energization from a single, direct current, power supply.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention relates generally to a predriver for switching applications. The predriver includes an input for receiving control information and an output that provides an output signal for implementing control of an associated switch device. The control information can trigger a change in the output signal, such as from a first generally stable level to a second generally stable level. During the change in the output signal between levels, the predriver operates in at least two transitional modes to control the output signal. For example, the predriver can cause the output signal to change at different rates in each of the transitional modes. By controlling the rate of change in the output signal in the transition modes, the predriver can mitigate flyback and/or provide slew rate control for the associated switch device.

Several predrivers, in accordance with an aspect of the present invention, further can be used in a system to facilitate operation of a motor (e.g., a spindle motor) having one or more phases. For example, associated pairs of predrivers can be connected to control respective pairs of switch devices of a switching system, in which each pair of switch devices is connected across an associated phase of the motor. The predrivers can control the transition between generally stable (e.g., HIGH and LOW) operating levels of their respective output signals, in accordance with an aspect of the present invention, to provide corresponding output signals to respective switch devices so as to achieve desired characteristics in the motor system.

Another aspect of the present invention relates to a method of controlling a switch device. The method includes providing an output signal at one of first and second generally stable operating levels, such as for operating an associated switch device in one of first and second states. The output signal is controlled according to at least two different rates during a change between states of the output signal, such as can be inititated by an associated control system.

The following description and the annexed drawings set forth certain illustrative aspects of the invention. These aspects are indicative, however, of but a few ways in which the principles of the invention may be employed. Other advantages and novel features of the invention will become apparent from the following detailed description of the invention when considered in conjunction with the drawings.

DETAILED DESCRIPTION OF THE INVENTION

Figure 1:
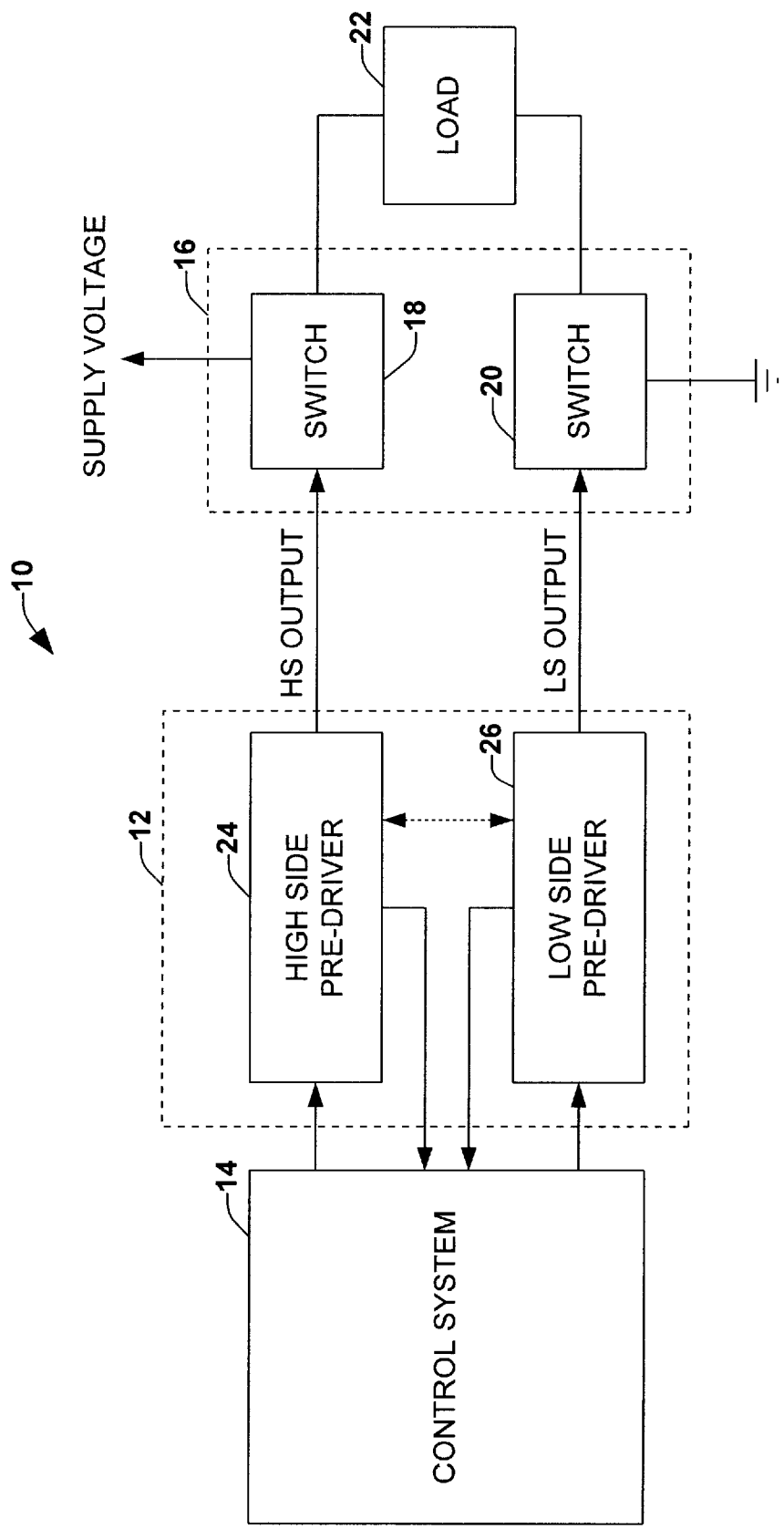
FIG. 1 is a simplified block diagram of a power system employing a driver in accordance with an aspect of the present invention.

FIG. 1 illustrates an example of a system 10 that includes a predriver 12 programmed and/or configured in accordance with an aspect of the present invention. The predriver 12 is connected between a control system 14 and a switching network 16. The control system 14 provides control information to the predriver 12. The control information indicates desired states for switching devices 18 and 20 of the associated switching network 16. The predriver 12 selectively controls operation of the switching devices 18 and 20 based on the control information so as to supply desired electrical power to an associated load 22. In particular, the control system 14 implements a PWM algorithm to control the driver 12 to operate the switching devices between ON and OFF conditions so as to drive the load 22. For example, the load 22 can be an inductive load, such as a phase of motor. It is to be understood and appreciated that the predriver 12 can be used in any application to energize an associated load coupled between a pair of switching devices.

The predriver 12 includes a high-side predriver 24 and a low-side predriver 26. Each of the predrivers 24 and 26 is connected to a respective one of the switching devices 18 and 20 and receives corresponding control information from the control system 14. The predrivers 24 and 26 provide respective output signals that vary between first and second generally stable operating conditions that control the amount of power supplied to the load 22. The stable operating conditions, for example correspond to HIGH and LOW output levels (erg., 5V and 0V, respectively). The control information from the control system 14 further helps ensure that the switches 18 and 20 are not both fully ON at the same time, as this tends to cause shoot-through current. Shoot through current generally corresponds to large levels of electrical current that can occur if both switching devices connected across a power supply are ON simultaneously. The control information also mitigates flyback, which can occur due to inductive properties from the load 22.

In accordance with an aspect of the present invention, each of the predrivers 24 and 26 is programmed and/or configured to provide two or more transitional output modes during a transition between the high and low levels. For example, one of the transitional output modes causes a rapid change in the output level, such as to minimize delays of the associated switch devices 18, 20. Another of the transitional output modes causes a slower, more controlled change in the output level of the predriver, which can be utilized to implement slew rate control at the output. The transitional output modes can be employed in a predetermined order when transitioning from HIGH to LOW (e.g., pulling LOW) and from LOW to HIGH (e.g., pulling HIGH) output levels. Additionally or alternatively, different characteristics can be utilized in the transitional modes depending on whether the predriver 24, 26 is pulling its output LOW or HIGH.

It is to be appreciated that the predriver 12 could be implemented as a single chip for driving associated switches. Alternatively, the predriver and associated switches could be implemented as a single driver chip for driving a motor. It is further to be understood and appreciated that in a motor control application, there typically will be separate pairs of high-side and low-side predrivers for each phase of the motor.

Figure 2:
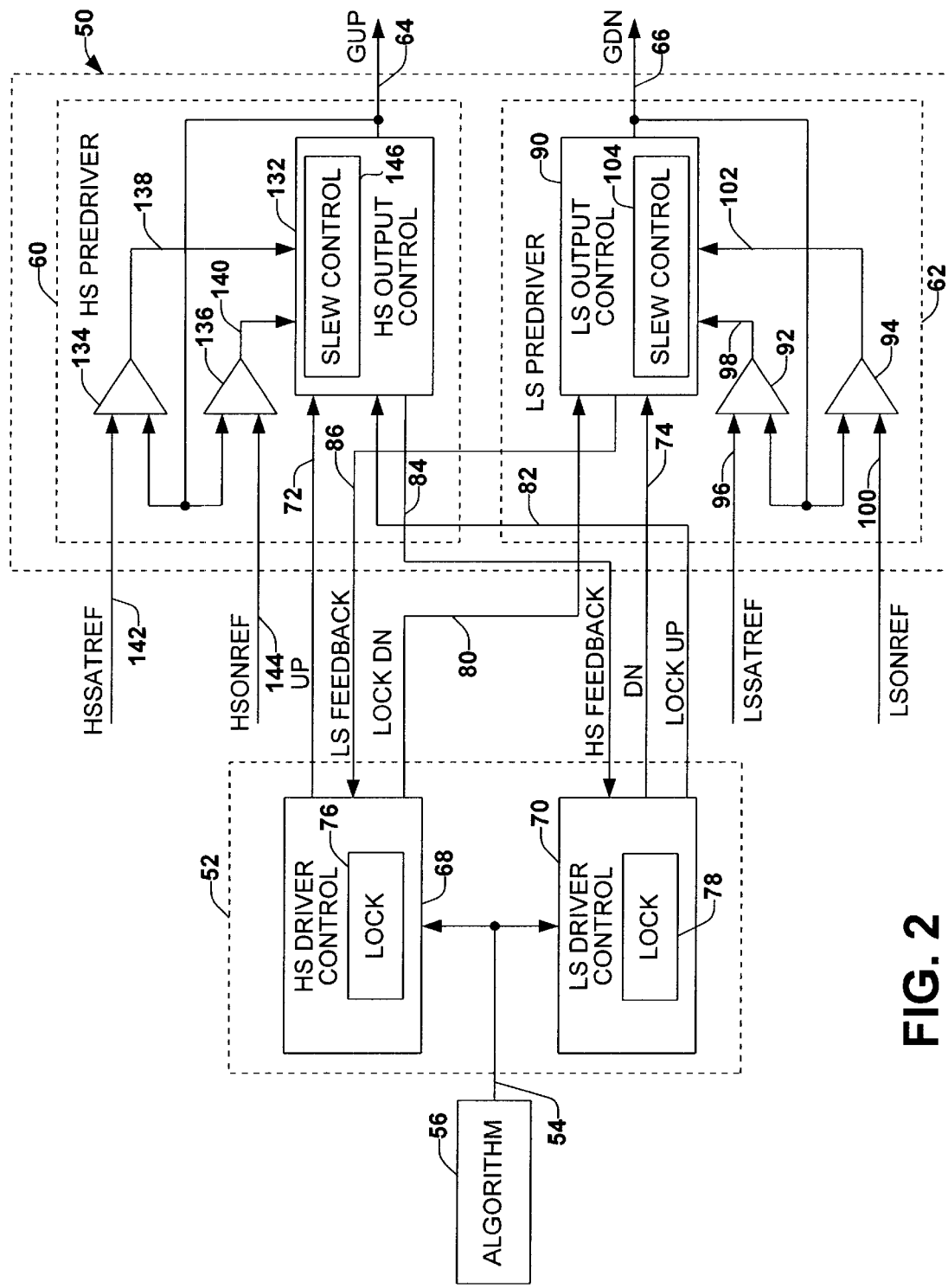
FIG. 2 is a block diagram of a driver in accordance with an aspect of the present invention.

FIG. 2 depicts a block diagram of a predriver 50 in accordance with an aspect of the present invention. The predriver 50 is operatively coupled to receive control information from a control system 52. The control system 52 is programmed and/or configured to implement desired control logic to facilitate desired operation of the driver 50. The control system 52 further receives an input control signal 54 from an algorithm 56 based on which it generates desired PWM timing for the associated predriver 50.

The predriver 50 includes a high-side (HS) predriver 60 and a low-side (LS) predriver 62. Each of the HS predriver 60 and LS predriver 62 provides a respective output signal GUP 64 and GDN 66 for controlling associated switch devices (not shown). The combination of predriver and associated switches in a given application define a driver. It is to be understood and appreciated that the predriver 50 could be implemented as a single chip or a driver (including the predriver and associated switches) could be implemented as a single chip.

In accordance with an aspect of the present invention, the predrivers 60 and 62 have two or more transitional operating modes when changing between their generally stable HIGH and LOW levels of their respective output signals 64 and 66. Each of the transitional operating modes causes a change in the output level at a different desired rate. In a motor control application, for example, there would be one instance of the predriver 50, which includes the HS and LS predrivers 60 and 62, for each phase of the motor being controlled.

The control system 52 includes a HS driver control 68 and a LS driver control 70. Each of the controls 68 and 70 provides a respective direction control signal, namely an UP signal 72 and a down (DN) signal 74. The UP signal 72 is the direction control for the HS predriver 60. For example, when the UP signal 72 switches from a HIGH to a LOW level, it causes the HS predriver 60 to initiate a sequence to turn the high side power device OFF. When the UP signal 72 switches to a HIGH level, it causes the HS predriver 60 to initiate a sequence to turn the high side power device to an ON condition.

The DN signal 74 is a direction control for the LS predriver 62. When the DN signal 74 switches from a HIGH level to a LOW level, it causes the LS predriver 62 to initiate a sequence to turn the low side power device OFF. When the DN signal 74 switches to a HIGH level, it causes the ILS predriver 62 to initiate a sequence to turn the low side power device ON. Each of the HS predriver 60 and the LS predriver 62 provides a respective feedback signal, namely the HS FEEDBACK signal 84 and the LS FEEDBACK signal 86. The HS FEEDBACK signal 84 is provided to the LS driver control 70 and LS FEEDBACK signal 86 is provided to the HS driver control 68. For example, the HS feedback signal 84 goes HIGH level to indicate when the associated high side power device is in an ON condition. Similarly, the LS feedback signal 86 goes HIGH to indicate when the low side power device is in an ON condition.

The controls 68 and 70 generate the UP and DN signals 72 and 74 based on the input control signal 54 from the algorithm 56 and on the HS FEEDBACK and LS FEEDBACK signals 84 and 86. For example, a LOW level input signal 54 commands the low side power device to turn ON once the high side power device is off (e.g., the DN signal 74 goes HIGH), and a HIGH level signal commands the high side power device to turn ON once the low side power device is off (e.g., the UP signal 72 goes HIGH). In addition to providing the UP signal 72 to the predriver 60, the HS driver control also can provide a non-overlapping inversion of UP signal (not shown).

Each of the driver controls 68 and 70 further includes a respective lock component 76 and 78. In particular, the lock component 76 generates a LOCK DN signal 80 that is provided to the LS predriver 62. The lock component 78 of the LS driver control 70 provides a LOCK UP signal 82 to the HS predriver 60. The LOCK UP signal 82 corresponds to a control that instructs the HS predriver 60 to turn an associated high side power device fully OFF. Similarly, the LOCK DN signal 80 is a control that causes the LS predriver 62 to turn its associated low side power device fully OFF. The lock components 76 and 78 thus enable independent clamping of the associated switch devices to help ensure desired stable operating states thereof.

Figure 3:
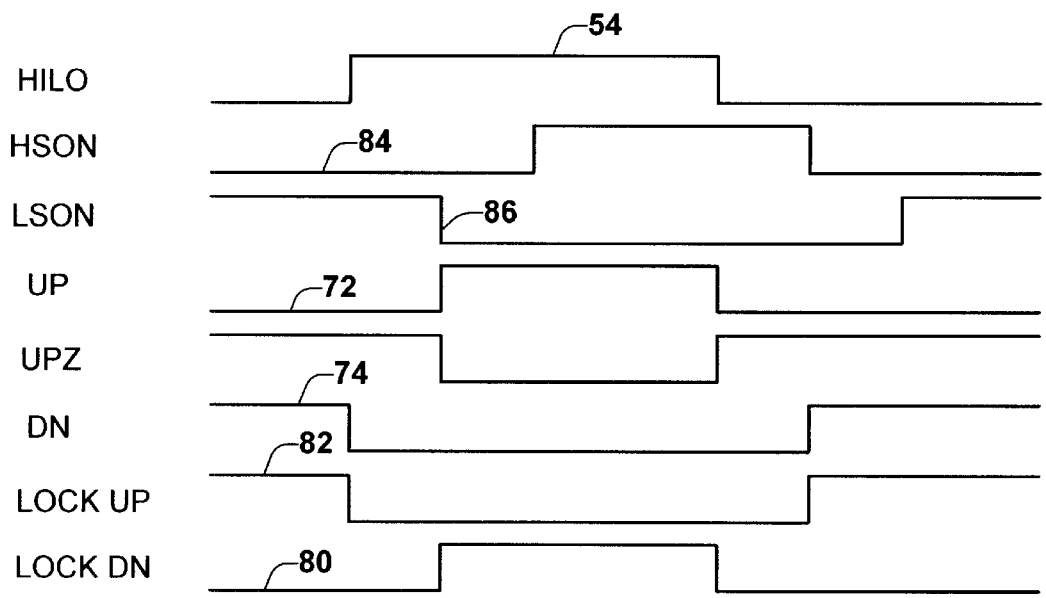
FIG. 3 is an example of a signal diagram for control logic relating to a driver implemented in accordance with an aspect of the present invention.

FIG. 3 depicts a relationship between various signals mentioned above, in which identical reference numbers refer to signals previously identified with respect to FIG. 2. FIG. 3 thus illustrates that when the input control signal 54 switches to a HIGH level, the DN and LOCK UP signals 74 and 82 are set low. This causes the LS predriver 62 (FIG. 2) to start turning its associated low side power device to an OFF condition, and causes the high-side power device to be released from being turned fully OFF. The LS feedback signal 86 goes to a LOW level when the low-side power device turns substantially OFF. This, in turn, causes the HS driver control 68 to set the UP and LOCK DN signals 72 and 80 to HIGH levels. As a result, the HS predriver 60 (FIG. 2) begins turning the high-side power device ON, and causes the low side power device to be turned fully OFF. This sequence helps ensure that the high side and low side power devices will not both be on at the same time, thereby avoiding shoot-through current that might occur if both devices were fully ON simultaneously. As shown in FIG. 3, a similar sequence occurs when the input signal 54 switches from HIGH to LOW. That is, the high side power device is turned OFF before the low side power device is turned ON.

Referring back to FIG. 2, the LS predriver 62 further includes a LS output control component 90 that receives the DN signal 74 from the LS driver control 70 as well as the LOCK DN signal 80. The LS output control 90 is programmed and configured to generate the output signal 66 that controls operation of the associated low-side switch device. As mentioned above, the LS predriver 62 operates in a plurality of modes, including two or more transitional modes, between operating modes associated with providing generally stable HIGH and LOW output levels at 66. A transition from one of the stable modes is initiated by a state change in the DN input signal 74 from the LS driver control 70.

In order to facilitate transitional modes, in accordance with an aspect of the present invention, the LS predriver 62 includes comparators 92 and 94. One comparator 92 receives as its inputs a low side saturation reference signal (LSSATREF) 96 and the output signal 66. The LSSATREF signal 96 corresponds to a reference level that determines when the LS predriver 62 will change transitional operating modes. That is, the comparator 92 provides a signal 98 to the LS output control 90 that indicates the value of the output signal 66 relative to the LSSATREF signal 96. Thus, when a desired relationship exists between the signals 66 and 96 (e.g., GDN≦LSSATREF), the LS output control 90 changes transitional modes of the LS predriver. The other comparator 94 receives the GDN output signal 66 and a low side ON reference (LSONREF) signal 100 as inputs. The comparator 94 provides an output signal 102 to the LS output control 90 based on the relative values of the LSONREF signal 100 and the output signal 66. The LS output control 90 employs the signal 102 to change from one transitional mode to another mode, which can be another transitional mode or one of its generally stable operating modes (e.g., to provide a HIGH or LOW level output at 66).

By way of example, the LS output control 90 changes the level of the output signal at a relatively slower rate during one transitional mode (e.g., when the output signal is below the level of the LSSATREF signal 96). The slow rate at which the output signal changes can be utilized to provide slew rate control. The LS output control 90 further controls the output signal to change at a faster rate during a different transitional mode (e.g., when the output signal is above the level of the LSSATREF signal). The fast rate at which the output signal changes mitigates delay characteristics of an associated switch device. Additionally the fast rate at which the output signal changes transitions can be controlled during a transition from a HIGH to LOW level of the output signal 64 and a transition from a LOW to HIGH level so as to mitigate propagation delay differences.

To facilitate slew rate control, the LS output control 90 further can include a slew control component 104. The slew control 104 can adjust the rate at which the output signal 66 changes, such as being preprogrammed and/or configured to implement desired slew rate control. It also may be desirable to implement slew control during a transition from a HIGH to LOW level of the output signal 66, a transition from a LOW to HIGH level of the output signal, or both. For example, the slew control 104 can control the rate at which the output signal changes during both transitions so as to substantially match rising and falling slew rates. The slew control 104 further can control the rate at which the GDN output 66 changes based on the particular direction that current is flowing through the associated load to which the switch devices are coupled.

Figure 4:
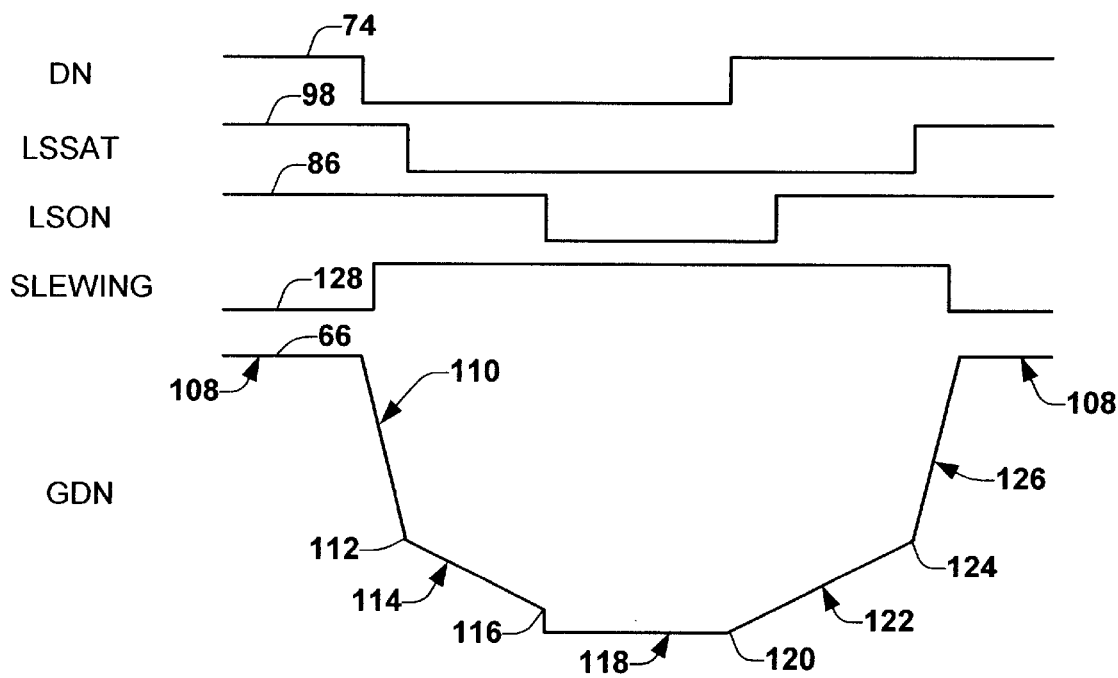
FIG. 4 is an example of a signal diagram illustrating the relationship between signals of a low side predriver in accordance with an aspect of the present invention.

FIG. 4 illustrates the relationship between the signals described above with respect to the LS predriver 62, in which identical reference numbers refer to signals previously identified with respect to FIG. 2. In FIG. 4, the GDN output 66 begins in its generally stable HIGH operating level. The first change in the GDN output 66 occurs when the DN signal 74 switches from HIGH to LOW, such as happens when the algorithm 56 (FIG. 2) initiates a transition for the associated load from LOW to HIGH. The LS predriver 62 (FIG. 2) responds by initially pulling the output 66 to a LOW level from the HIGH level, indicated at zone 108, to LOW condition at a fast rate. The fast rate of change in the output signal 66, indicated at zone 110, corresponds to a first transitional operating mode of the LS predriver 62. In zone 110, the power device begins going from a fully ON condition to the point where output switching starts to occur. This zone can be optimized for minimal time delay within the power consumption constraints associated with a particular application.

When the output 66 reaches a level 112 determined by the LSSATREF signal 96, which level may be programmable, a LSSAT signal 98 within the LS predriver 62 (FIG. 2) goes LOW. This causes the LS predriver 62 to switch to a second transitional operating mode, indicated at zone 114. In the operating mode associated with zone 114, the output signal 66 is still being pulled low, but at a slower rate than in zone 110. In zone 114, the associated switch device is going through a region where it becomes more resistive, and the output swing may occur. This zone can be optimized for slew rate compliance. For example, the slower rate of change associated with zone 114 enables slew rate control in accordance with an aspect of the present invention. The slew rate control can depend on the direction current is flowing relative to an inductive load connected between the high-side and low-side switch devices that are controlled by the output signals 64 and 66.

By way of example, if current is flowing out of an inductive load and into the predriver 50 (FIG. 2), the zone 114 controls the voltage slew rate at the driver output 66. As the low side power device is turning OFF, the inductive load will tend to pull the voltage HIGH to maintain its present current flow. When the low side power device is completely OFF, and before the high side power device can be turned ON, the inductive load will cause the voltage at the output of the driver to raise above the driving power supply coupled to the high-side switch device. This is known as positive flyback. There is usually either a deliberate or parasitic diode connected to the supply, and the voltage is thus limited to a forward diode drop above that supply. If current is flowing into an inductive load and out of the driver 50 (FIG. 2), the zone 114 will not control the voltage slew rate at the driver output. In this case, as the low side power device is turning off, the inductive load will try to pull the voltage LOW to maintain current flow. When the low side power device is completely OFF, and before the high side power device can be turned ON, the inductive load will cause the voltage at the output of the driver 50 to fall below the lowest supply (e.g., ground potential). This is known as negative flyback. There is usually either a deliberate or parasitic diode connected to ground, and the voltage is thus limited to a forward diode drop below ground. The slew control associated with zone 114, however, mitigates flyback.

Referring back to FIG. 4, when the low side output signal 66 reaches a level 116 determined by the LSONREF 100 signal, the LSON signal 86 goes LOW. The HS driver control 68 of the control logic 52 uses the LSON signal 86 to set LOCK DN signal 80 to a HIGH condition. This, in turn, shifts operation of the LS predriver 62 to a stable operating mode in which the output signal 66 is fully OFF, as indicated at zone 118. At the end of the zone 114 associated with the second transitional operating mode of the LS predriver 62, the low side power device can be partially to fully OFF, and the high side power device will have not yet started to turn ON. The output can be in a flyback condition in this interval. Shifting out of the zone 114 before the output signal 66 is fully LOW (zone 118) helps minimize the flyback time. During the zone 118, the HS driver, control 68 of the control logic 52 can set the UP signal 72 to a HIGH condition, which starts the sequence to turn the high side power device ON.

FIG. 4 also shows the output signal 66 during a transition where the DN signal 74 switches from LOW to HIGH (e.g., from zone 118 back to zone 108). In general, similar events, including transitional operating modes, can occur as described above when the DN signal 74 switches from HIGH to LOW. That is, when the DN signal goes HIGH, indicated at 120, the predriver is in a transitional operating mode identified as zone 122. In the zone 122, the LS output control 90 (FIG. 2) pulls the output signal 66 HIGH at a relatively slow rate. In Zone 122, the associated low side switch device is going from fully OFF through the resistive turn-on (similar to the zone 114). This zone can also be optimized for slew rate compliance. The transitional zone 122, which corresponds to transitional operating mode of the LS predriver 62, controls the slew rate at the output of the driver during a HIGH to LOW transition provided that the inductive load is in a positive flyback condition.

When the output signal 66 reaches a desired level, such as determined by the LSSATREF signal 96 (or another reference level), as indicated at 124, the predriver 62 (FIG. 2) switches to another transitional operating mode associated with zone 126. In the operating mode associated with the zone 126, the LS output control 90 pulls the output signal 66 HIGH at a relatively fast rate. In zone 126, the associated load will have already transitioned from HIGH to LOW, and the power device is being turned more fully ON (e.g., being turned ON harder). Zone 126 can be optimized for minimal time delay within the power consumption constraints, which results in minimized flyback time, minimized delay through the driver, and minimal skew. From zone 126, operation transitions back to zone 108, namely a stable HIGH level. After transitioning from zone 126 to zone 108, the predriver can use a reduced maintenance current for biasing its output to the stable HIGH level without affecting the over-all performance. This mitigates the amount of current used by the predriver 62.

In view of the foregoing discussion of FIG. 4, it is to be appreciated that the higher pull-down rates of the zone 110 relative to zone 114 helps to minimize the delay from the commanded switch device to the time the output of the driver responds. The slower rates associated with the zones 114 and 122 are set to produce a desired slew rate at the output of the driver 52. Further by making the pull-down and pull-up rates of zones 114 and 122 programmable allows the slew rate to be programmable. Similarly, the higher pull-up rate associated with zone 126 relative to zone 122 also mitigates delay through the driver. Zones 110 and 126 further can be designed to have a ratio that minimizes skew.

A stewing signal 128 shown in FIG. 4 corresponds to an internal signal of the LS output control that shifts the low side pre-driver into an operating mode associated with a the HIGH stable zone 108, namely, where the low side power device is fully turned ON.

Referring back to FIG. 2, the HS predriver 60 is programmed and/or configured to control the output signal 64 so as to provide two or more transitional zones when the output signal switches between generally stable HIGH and LOW output levels, such as in response to the UP signal 72 and the LOCK UP signal 82. In the example of FIG. 2, the HS predriver 60 is substantially similar to the LS predriver 62 described above. Briefly stated, the HS predriver 60 includes a HS output control component 132 that receives the UP signal 72 and the LOCK UP from the control logic 52. The HS predriver 60 also includes comparators 134 and 136 that provide respective signals 138 and 140 to the HS output control 132. The comparator 134 provides the signal 138 according to the relative value of a high side saturation reference signal (HSSATREF) 142 and the GUP output signal 64. The HSSATREF signal 142 provides a reference level that determines when the HS predriver 60 will change transitional operating modes.

For example, when a desired relationship exists between the signals 64 and 142 (e.g., GUP≦HSSATREF) during a change between stable levels of the GUP signal 64, the HS predriver 60 changes transitional modes. The other comparator 136 provides its output 140 based on the output signal 64 relative to a high side ON reference (HSONREF) signal 144, which can be used to change operating modes of the HS predriver 60. For example, the signal 140 can cause the predriver to change to another transitional mode or, alternatively, force the GUP output 64 to another generally stable operating mode.

By way of example, the HS output control 132 changes the level of the output signal 64 level at a relatively slower rate during one transitional mode, such as-when the output signal is below the level of the HSSATREF signal 142, and at a faster rate during a different transitional mode such as when the output signal is above the level of the HSSATREF signal. The slow rate of change in the output signal 64 at low transitional output levels provides slew rate control. The fast rate near the HIGH output level mitigates delays of a switch device associated with the HS predriver 60. Additionally the fast rate at which the output signal changes transitions can be controlled during a transition from a HIGH to LOW level of the output signal 64 and a transition from a LOW to HIGH level so as to mitigate propagation delay differences.

To facilitate slew rate control, the HS output control 132 further can include a slew control component 146. The slew control 104 can adjust the rate at which the output signal 64 changes, such as being preprogrammed and/or configured to implement desired slew rate control. The application of slew control further depends on the particular direction that current is flowing through the associated load to which the switch devices are coupled. It may be desirable to implement such slew control during a transition from a HIGH to LOW level of the output signal 64, a transition from a LOW to HIGH level of the output signal, or both. For example, the slew control 104 can control the rate at which the output signal changes during both transitions so as to substantially match rising and falling slew rates. The application of slew control further can depend on the direction that current flows through an associated switch device during such a transition.

Figure 5:
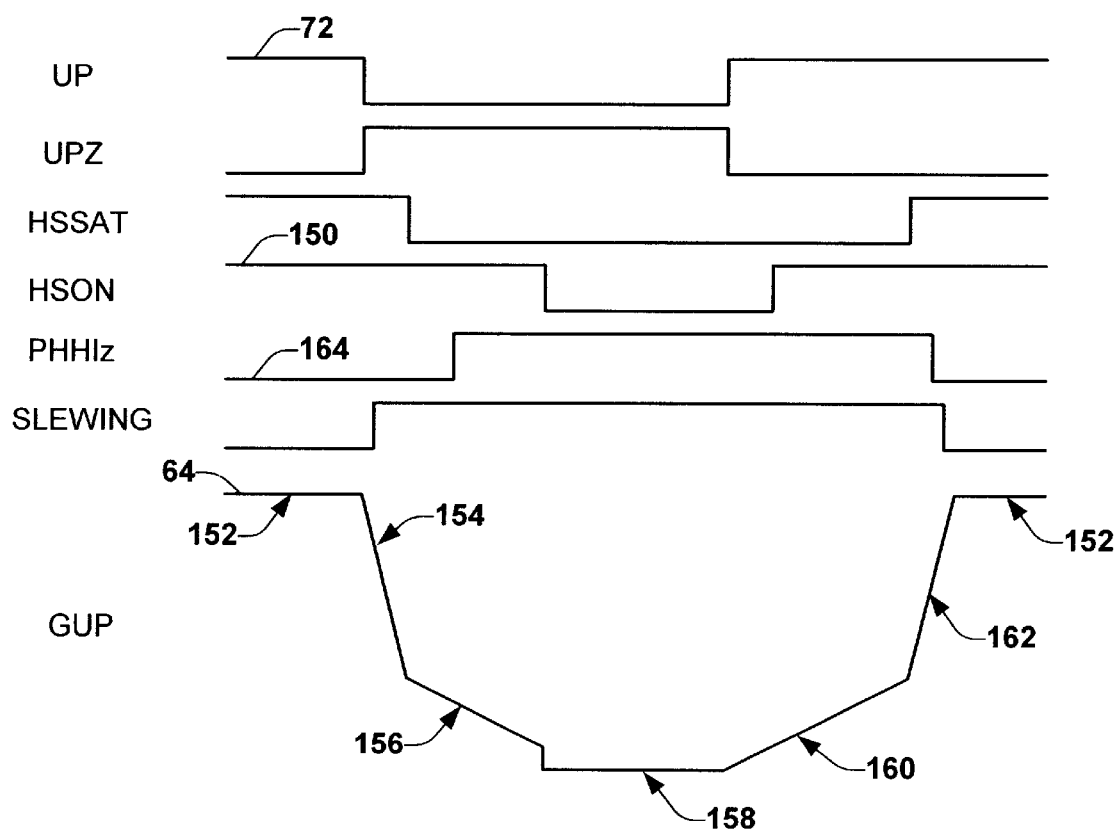
FIG. 5 is an example of a signal diagram illustrating the relationship between signals of a high side predriver in accordance with an aspect of the present invention.

FIG. 5 illustrates an example of signals associated with the HS predriver 60, in which identical reference numbers refer to signals previously identified with respect to FIG. 2. Because the relationship of the signals shown in FIG. 5 is analogous to the relationship described above with respect to FIG. 4, a detailed description of the signals in FIG. 5 has been omitted for sake of brevity. That is, the UP signal 72 is generally equivalent in function to the DN signal 74; HSSAT 150 is generally equivalent to the LSSAT signal 98; HSON 84 is generally equivalent to the LSON signal 86, and the SLEWING signals are generally equivalent.

The HS predriver 60 operates in a plurality of transitional modes when switching the output signal between HIGH and LOW levels. The different modes of the HS predriver 60 are associated with zones 152, 154, 156, 158, 160 and 162. For example, in zone 154 the output signal is pulled LOW from a generally stable HIGH level (zone 152) at a relatively high rate and in zone 162 it is pulled high at a fast rate. In contrast, the output signal 64 transitions from zone 154 to zone 156 in response to the output signal falling below the HSSATERF signal. The transition from zone 156 to 158, which corresponds to the stable LOW level (e.g., OFF), occurs based on the output signal relative to the HSONREF signal 144 (FIG. 2). In both zones 156 and 160, the output signal 64 can be driven at a relatively slower rate so as to control the slew rate. Slew rate control further can vary depending on the direction of current through the associated switch devices where an inductive load is coupled between the switch devices. In particular, the zone 156 controls the slew rate of a HIGH to LOW transition on the driver output when there is a negative flyback condition. Similarly, the zone 160 controls the slew rate of a LOW to HIGH transition when there is a negative flyback condition. When operating in the stable HIGH zones 152, power can be conserved by reducing the biasing current to a desired maintenance level that is less than the biasing current used to pull output signal 64 HIGH.

FIG. 5 further shows a PHHIz signal 164, which is a phase HIGH signal internal to the HS predriver 60 and does not have an equivalent signal shown in FIG. 4 in connection with the LS predriver. The PHHIz signal 164 has the same effect as does the HSSAT signal 84 when it goes HIGH. That is, when the PHHIz signal 164 goes LOW, it shifts the operation of the HS predriver from the zone 160 to the zone 162, forcing the UP signal HIGH. The PHHIz signal 164 goes LOW when the driver output voltage level is close to the driving supply voltage. Accordingly, the PHHIz signal 164 mitigates the time spent in the zone 160 during a positive flyback condition, thereby helping to minimize flyback. The PHHIz signal 164 is utilized in the HS predriver 60, and not in the LS predriver 62, because of the difference in the voltage swings of the two predrivers. For example, the LS predriver 62 swings from ground to VISO, and the HS predriver 60 swings from ground to VPUMP, which in is greater than VISO (e.g., VPUMP≈2VISO). It is to be appreciated that the PHHIz signal 164 may not be necessary in some applications of the predriver 50, such as in the case where the high side power device is either a p-channel FET or a bipolar PNP.

The control logic 52 further employs zone transition detectors to help insure nonoverlap of the high and low side power devices. This helps prevent shoot-through current from occurring. The configuration is flexible, as the predrivers 60 and 62 can be programmed and/or configured to behave differently in each zone. The trip levels can be adjusted to give optimal performance for the particular technology process in which the predriver 50 (FIG. 2) is implemented. The output voltage slew rate further can be made programmable by adjusting the rate associated with zones 114 and 122 (FIG. 4) and/or zones 156 and 160 (FIG. 5) without affecting the delays that are associated with respective zones 110 and 126 (FIG. 4) and/or zones 154 and 162 (FIG. 5).

While slew rate control has been illustrated with respect to both a transition from HIGH to LOW and from LOW to HIGH (zones 114 and 122 of FIG. 4 by the LS predriver and zones 156 and 160 of FIG. 5 by the HS predriver), it is to be understood and appreciated that slew rate control alternatively could be implemented by only one of the high side predriver and the low side predriver during a transition between HIGH and LOW states. For example, if slew rate control is implemented by the LS predriver during a transition from HIGH to LOW, the slew rate control (shown and described in zone 160 of FIG. 5) by the HS predriver could be omitted, such that the UP output signal ramps at a relatively faster rate from the LOW to HIGH level. In addition, while the transition between HIGH and LOW levels have been described as having two zones of different rates, it is to be appreciated that more than two zones also could be implemented during such a transition in accordance with an aspect of the present invention.

Figure 6:
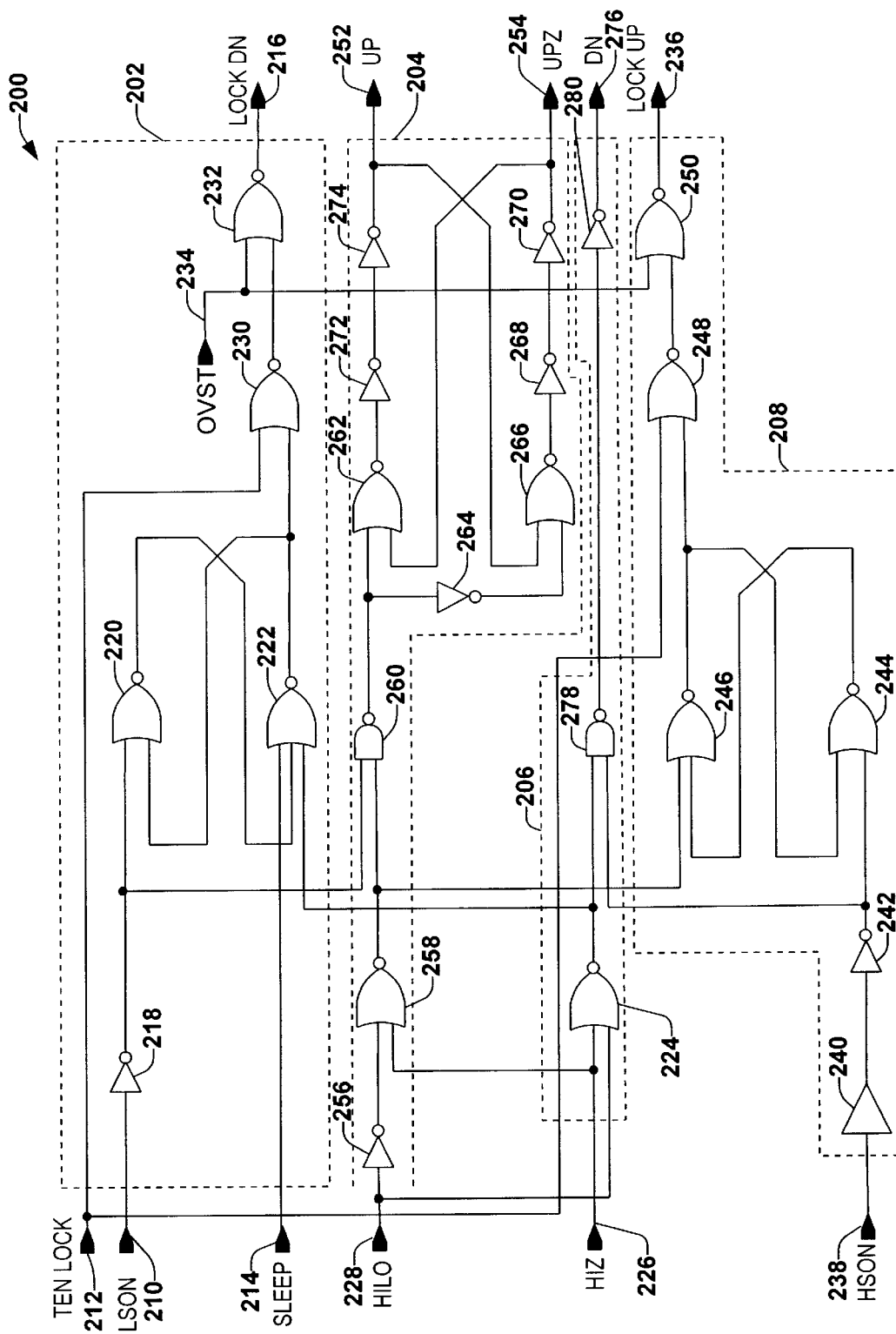
FIG. 6 is an example of control logic that can be used to control a driver in accordance with an aspect of the present invention.

FIG. 6 is an example of a block diagram for a control system 200 that could be implemented to control predrivers in accordance with an aspect of the present invention. The control logic is utilized to derive desired outputs for controlling operation of associated pre-drivers. The control system 200 can be implemented as digital circuitry, an algorithm implemented by a processor, analog circuitry, and/or an application specific integrated circuit. For simplicity of illustration and explanation, the control system 200 has been divided into four generally interdependent functional units 202, 204, 206 and 208, each of which derives a different output signal for use in controlling one or more associated predrivers.

The functional unit 202 provides an output LOCK DN signal as a function of a feedback signal from a low side pre-driver, namely a LSON signal 210. The LOCK DN signal goes HIGH to ensure that the low side device is OFF. Additional test signals including a TEN LOCK signal 212 and a SLEEP signal 214 also can be utilized to derive a desired LOCK DN signal 216 during a test mode. The TEN LOCK signal forces the LOCK UP and LOCK DN signals HIGH, and allows these functions to be tested independently. This also improves the observability of some of the individual components of the driver. The LSON signal 210 is inverted by an inverter 218, which drives an input of a NOR gate 220. Another input of the NOR gate 220 is provided from an output of another NOR gate 222. The NOR gate 222 is driven by the sleep signal 214 and an output of a NOR gate 224, which is driven by an HIZ input signal 226 and a HILO input signal 228. When the HIZ signal goes HIGH, the high side and low side devices are turned OFF. The HIZ signal 226 is an input that causes both the high side and low side power devices to turn OFF, which in effect forces the driver in a tri-state or high impedance (HI-Z) mode. The output of the NOR gate 220 also is provided to an input of the NOR gate 222. The NOR gate 222, in turn, is provided to a subsequent NOR gate 230 where it is NORed with the TEN LOCK input signal 212.

The output of the NOR gate 230 drives a final output NOR gate 232 by NORring the output of 230 with an OVST (Over Voltage Stress Test) input signal 234. Thus, the LOCK DN signal 216 follows the logic level of the LSON input signal 210 as well as can be driven to an ON condition by application of the TEN LOCK signal 212 as a test signal. When the LOCK DN signal 216 goes HIGH, it provides a control to turn an associated low side power device fully OFF based on the LSON signal going LOW.

The functional unit 208, which provides a LOCK UP signal 236 to turn a high side power device fully off, operates similarly to the functional unit 202. The functional unit 208 receives a HSON input signal 238 at a buffer 240. A buffered signal is provided to an inverter 242, which is provided as an input to a NOR gate 244. Another input of the NOR gate 244 is received from an output of an associated NOR gate 246. The NOR gate 246 receives as its input the output of the NOR gate 244 and an input derived from a combination of NORing the HIZ signal 226 and the HILO input signal 228. The output of the NOR gate 246 is provided as an input to a subsequent NOR gate 248, which NORs the output of 246 with the TEN LOCK signal 212. The NOR gate 248 provides an input to an output NOR gate 250, which NORs the output of the NOR gate 248 with the OVST input signal 234 to provide the LOCK UP output signal 236. The LOCK UP signal 236 thus goes HIGH in response to the HSON signal going LOW.

The functional unit 204 is utilized to provide an UP output signal 252 and an UPZ output signal 254, which is a non-overlapping inversion of the UP signal. The UP and UPZ signals can be utilized to implement direction control to change an associated high side switch device between HIGH and LOW conditions. The functional unit 204 receives the HILO input signal 228 at an inverter 256 to drive an input of a NOR gate 258. Another input of the NOR gate 258 is the HIZ signal 226. The output of the NOR gate 258 is provided into an input of an NAND gate 260, which NANDs the output of 258 with the inversion of the LSON signal (the output of the inverter 218). This helps ensure that the UP signal 252 does not go HIGH when the low side switch is fully ON, which helps prevent shoot-through current.

The NAND gate 260 provides an input to an inverter 264 that is used to derive the inverted output signal 254. In particular, the inverter provides an input to an NOR gate 266. The UP signal 252 is provided as the other input to the NOR gate 266, which (provides its output signal to a string of associated inverters 268 and 270. The output of the inverter 270 corresponds to the UPZ signal 254. The output 254 of the inverter 270 also is fed back as an input to the NOR gate 262, which NORs the UPZ signal 254 with the output of the NAND gate 260. The output of the NOR gate of 262 is then provided to a pair of inverters 272 and 274 to provide the UP output signal 252.

The functional unit 206 is utilized to provide a DN output signal 276. The DN signal 276 provides direction control for a low side power driver that is used to initiate a sequence to change operating conditions of an associated power device. The functional unit 206 includes the NOR gate 224 that NORs the HILO signal 228 with the HIZ signal 226. The output of the NOR gate 224 is provided as an input to an NAND gate 278. Another input to the NAND gate 278 is derived from buffering and inverting the HSON signal 238 (the output of the 242). The NAND gate 278 drives an associated inverter 280 to provide the desired DN output signal 276. That is, the DN output signal 276 goes HIGH when both the HILO input signal is LOW and the HSON signal goes LOW.

Figure 7:
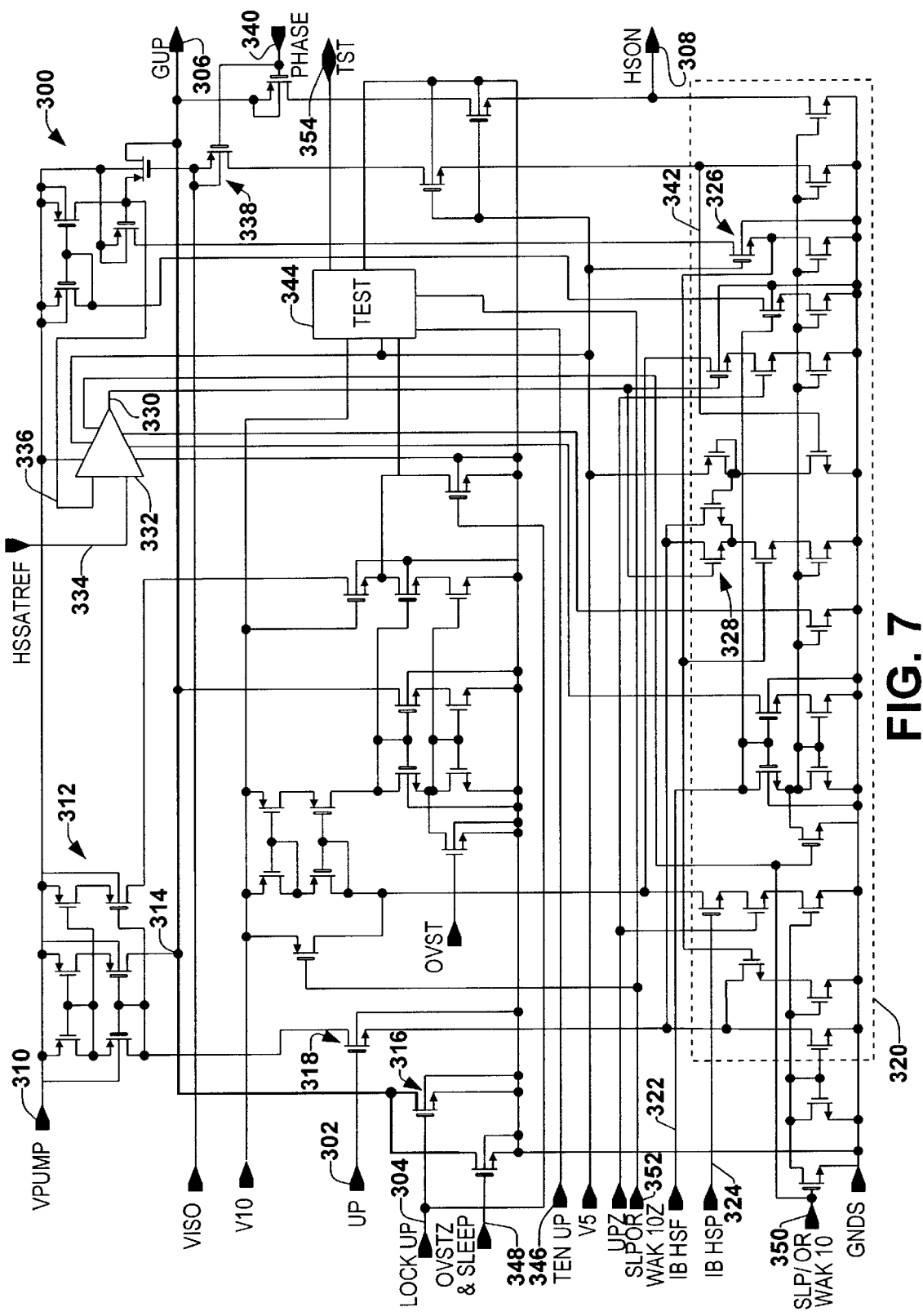
FIG. 7 is a circuit diagram illustrating an example of a high side predriver accordance with an aspect of the present invention.

FIG. 7 illustrates a circuit arrangement that can be employed to implement a high-side predriver 300 in accordance with an aspect of the present invention. In this example, the predriver 300 is configured for operation with an n-channel FET as an associated high side power device. Those skilled in the art will understand and appreciate other predriver arrangements that could be utilized for controlling an n-channel FET as well as other implementations for other types of power devices in accordance with an aspect of the present invention.

The predriver 300 receives as its primary inputs an UP signal 302 and a LOCK UP signal 304, such as from associated control logic. The UP signal 302 provides direction control for the predriver. The LOCK UP signal 304 is a control that instructs the HS predriver 60 to turn an associated high side power device fully OFF. The predriver 300 generates a GUP output signal 306 and a HSON signal 308 generally in response to the UP and LOCK UP signals 302 and 304, respectively. The GUP signal 306 drives the gate of the associated power FET (or other switch device) to control its operation between ON and OFF conditions in accordance with an aspect of the present invention. The HSON signal 308 is the output provided to the main control logic, which indicates whether the associated switch device is in an ON or OFF condition.

The predriver 300 is driven between ground potential (GNDS) and a voltage associated with a VPUMP input signal 310 (e.g., about 10V). An arrangement of transistors 312 provides a current source function to pull node 314 to VPUMP, which is coupled to the GUP output 306. The node 314 also is coupled to transistors 316, which is associated with the LOCK UP input 304. Thus, if the LOCK UP signal 304 is HIGH, the transistor 316 is activated to an ON condition to force the GUP output LOW by coupling it to ground potential GNDS.

The UP input 302 controls an associated transistor 318 that is electrically coupled to a biasing network, indicated generally at 320. The biasing network 320 utilizes an arrangement of transistors to control the level of the GUP output 306 in accordance with an aspect of the present invention. Two main inputs to the biasing network are IB HSF 322 and IB HSP 324. For example, the IB HSP signal 324 is a programmable input bias current and the IB HSF 322 has a fixed input bias current.

The biasing network 320 operates to control the change in the GUP output signal 306 when the UP input 302 changes from HIGH to LOW and/or from LOW to HIGH. Specifically, the transistor 318 is operative to control associated transistors 326 and 328 of the biasing network 320. Operation of such transistors 326 and 328 further depends on an output 330 of a differential comparator 332. The biasing network 320 controls the rate at which the GUP output 306 changes based on the operating condition of the transistors 326 and 328.

The comparator 332 operates to control an operating mode of the predriver 300 based on inputs 334 and 336 during a transition between HIGH and LOW levels at the GUP output 306. The input 334 is a HSSATREF signal, which corresponds to a voltage level that determines when the predriver 300 will change modes as it responds to a state change of the UP input 302. In particular, the HSSATREF corresponds to a saturation threshold when the associate switch device becomes resistive. The HSSATREF signal can be fixed, variable, and/or programmable. The other input 336 corresponds to level output GUP 306. A network of transistors 338 are arranged to determine whether the GUP output 306 is coupled to the input 336. The network 338 controls the input 336 based on a signal provided at phase input 340. The phase input 340 monitors the load (e.g., a phase of a polyphase motor) and can cause the predriver 300 to change modes.

By way of illustration, when the UP input 302 goes from HIGH to LOW, the transistor 318 causes the biasing network 320 to initiate a change in the GUP output 306. Initially during such a transition, the biasing network 320 pulls the GUP output down towards ground at a rapid rate so as to mitigate time delay and skew of the associated switch device. The comparator 332 monitors the output 306 via the input 336. When the comparator determines that the GUP output 306 reaches (or drops below) the HSSATREF threshold, the comparator drives its output 330 LOW, thereby indicating a saturation condition for the associated switching device. This causes a change in the operating mode of the predriver 300 wherein the GUP output is pulled down at a slower rate than initially. The rate at which the GUP output 306 is driven LOW, which may be programmable, can operate to control the slew rate, as described herein. When the GUP output reaches another threshold level, the HSON signal goes LOW, which biasing forces GUP to a stable OFF condition.

Similar circumstances occur during a transition from the stable OFF condition to a stable ON condition, such as when the UP input 302 switches from LOW to HIGH. Initially, the biasing network 320 pulls the GUP output 306 HIGH at a slow rate, which can be used to implement slew rate control. It is to be appreciated that such slew rate control and slow transition rate can vary according to the direction of the current through the associated load and whether any slew rate control is being performed by another driver that controls a switch device coupled to the other side of the load. The predriver 300 switches to a next transitional operating mode, such when the comparator 332 determines that the GUP output is above the level of the HSSATREF signal.

Alternatively or additionally, the biasing network 320 also can switch operating modes based on a PHHIz signal 342. For example, the PHHIz signal 342 goes LOW when the PHASE input 340 approaches the level of driving supply voltage VISO. Thus, the PHHIz signal 342 has essentially the same effect that the output 300 of the comparator 332 does when it switches HIGH; namely, it causes the biasing network 320 to change transitional operating modes of predriver 300. Specifically, it causes the biasing network 320 to change from pulling the GUP output 306 HIGH at a slow rate to faster rate. As a result, the PHHIz signal 342 helps minimize the time spent at the slow transitional rate during a positive flyback condition. After the GUP output 306 reaches its stable HIGH level, the biasing network 320 also reduces the current that is used to pull GUP HIGH, thereby conserving power.

The particular predriver 300 shown in FIG. 7 also facilitates monitoring of the above-described functionality by implementing test features via a test module 344. For example, the predriver includes a TEN UP input 346, an OVSTZ & SLEEP input 348, a SLP OR WAK 10 input 350, and a SLP OR WAK 10Z test mode input 352, all of which are provided to the test module as well as other parts of the predriver for forcing desired operating conditions during a test mode. The various functionality monitoring can be performed via a TST input/output 354 of the test module 344.

Figure 8:
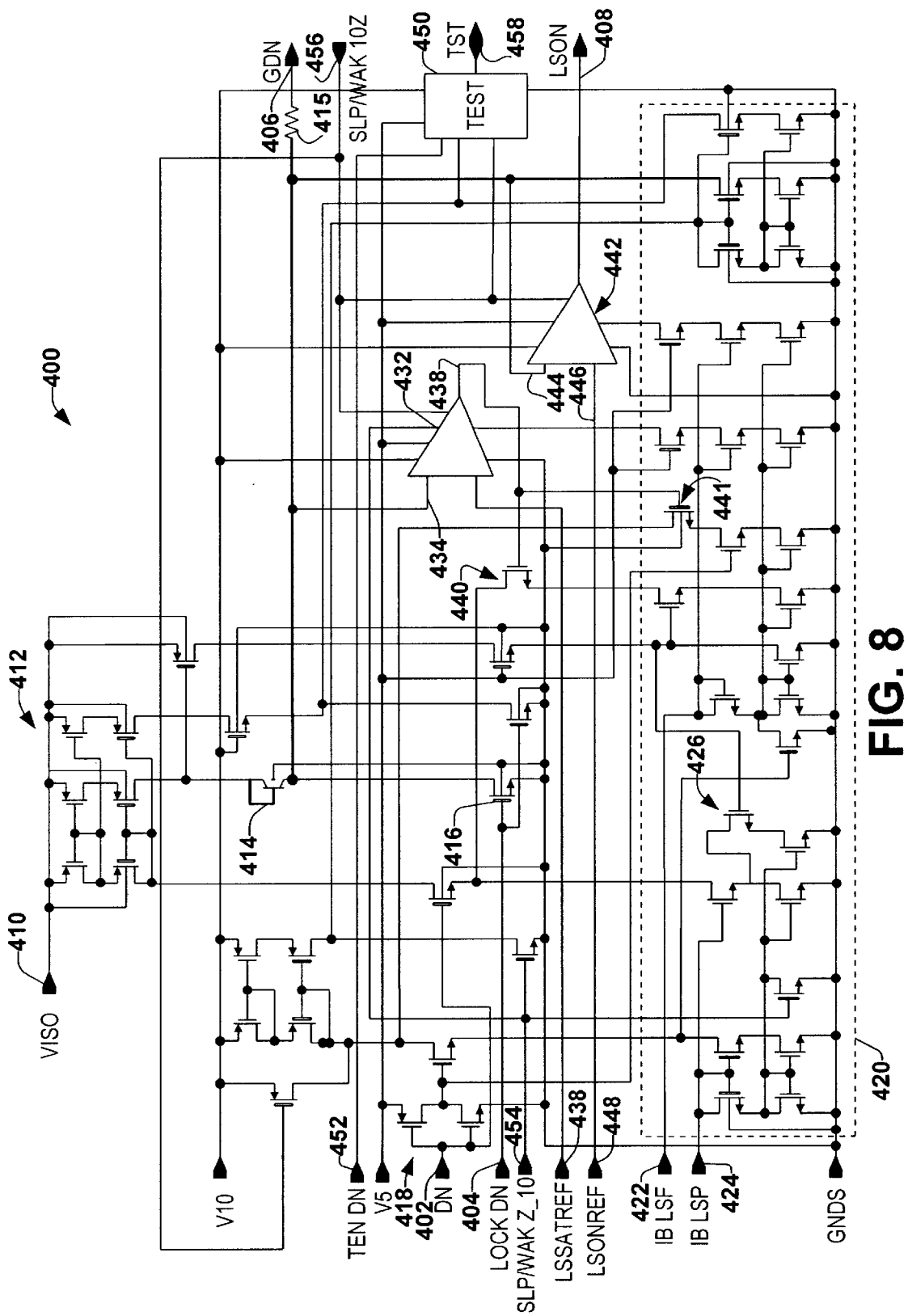
FIG. 8 is a circuit diagram illustrating an example of a low side predriver accordance with an aspect of the present invention.

FIG. 8 illustrates a circuit arrangement that can be employed to implement a lowside predriver 400 in accordance with an aspect of the present invention. In this example, the circuit arrangement is configured for operation with an n-channel FET as an associated low side power device, such as can be coupled to a load opposite the high side power device mentioned with respect to FIG. 7. Those skilled in the art will understand and appreciate various predriver arrangements that could be utilized for controlling an associated power device in accordance with an aspect of the present invention. The predriver 400 operates similarly to the predriver 300 of FIG. 7.

The low side predriver 400 receives as its primary inputs a DN signal 402 and a LOCK DN signal 404 from associated control logic. The DN signal 402 provides direction control for the predriver 400, which direction is reflected at a GDN output 406 of the predriver. The predriver 400 controls the GDN output 406 to drive a gate of an associated FET (or other switch device). The predriver 400 also includes a LSON output 408, which provides main feedback to the control logic indicative of whether the associated switch device is ON or OFF. The LOCK DN signal 404 is a control that instructs the predriver 400 to turn an associated high side power device fully OFF. The predriver 400 generates the GDN signal 406 and the LSON signal 408 generally in response to the DN and LOCK DN signals 402 and 404, respectively.

The predriver 400 is driven between generally stable operating levels, namely between ground potential (GNDS) and a voltage provided at a VISO input signal 410 (e.g., about 5V). An arrangement of transistors 412 operates as a current source, which is transmitted through a buffering transistor 414 to a node coupled to the GDN output 406 through a resistor 415. The output node of the buffering transistor 414 also is coupled to a transistor 416, which is associated with the LOCK DN input 404. Thus, if the LOCK DN signal 404 is HIGH, the transistor 416 is activated to force the GDN output LOW by coupling it to ground potential GNDS.

The DN input 402 controls an associated transistor network 418 that is electrically coupled to a biasing network, indicated at 420. The biasing network 420 utilizes an arrangement of transistors to control the level of the GDN output 406 in accordance with an aspect of the present invention. The biasing network includes an IB LSF input 422, which receives a fixed bias current, and an IB LSP input 424, which is a programmable input bias current.

The biasing network 420 operates to control the change in the GDN output signal 406 in response to changes in the DN input 402 (e.g., transitioning from HIGH to LOW and/or from LOW to HIGH). For example, the transistor network 418 is operative to control various parts of the biasing network 420 by setting an output level at selected parts of the biasing network. Such control during a transition in the GDN output 406 varies according to an operating mode of the predriver 400.

For example, the predriver 400 includes a comparator 432 operative to control the operating mode of the predriver 400 during a controlled transition of the GDN output 406. bie comparator includes inputs 434 and 438. The input 434 receives a LSSATREF signal 438, which corresponds to a reference voltage level that determines when the predriver 400 will change transitional operating modes, as it responds to a state change of the DN input 402. The LSSATREF signal can be fixed or programmable. The other input 434 corresponds to the GDN output 406.

By way of illustration, when the DN input 402 goes from HIGH to LOW, the transistor network 418 is activated to cause the biasing network 420 to initiate a change in the GDN output 406. Initially during such a transition, the biasing network 420 pulls the GDN output down towards ground (GNDS) at a rapid rate, which can be optimized to A mitigate time delay and skew of the associated switch device. The comparator 432 monitors the output 406 via the input 434. When the comparator 432 determines that the GDN output 406 reaches (or drops below) the LSSATREF threshold level, the comparator drives its output (e g., LSSAT) 438 LOW, thereby indicating there is no longer a saturation condition for the associated switching device. The output 438 is coupled to control transistors 440 and 441, which are used to implement desired control operation via the biasing network 420. For example, when the output 438 goes LOW, it causes a change in the operating mode of the predriver 400 wherein the biasing network 420 pulls the GDN output 406 down at a slower rate than its initial rate change. The rate at which the GUP output 406 is driven LOW can be programmable and operates to control the slew rate, as described herein. The biasing network 420 further controls slewing of the bias current according to the condition of the transistor 426.

The predriver 400 also includes another differential comparator 442 operative to determine when the predriver is to change from the operating mode having the slow pull down rate to its stable condition when the GDN output 406 is fully LOW. The comparator 442 has inputs 444 and 446 that receive the GDN output signal and a LSON reference signal 448. The LSON reference signal 448 can be fixed or programmable. The comparator 442 drives the LSON output 408 based on the relative levels at the inputs 444 and 446. For example, when the GDN output 406 falls below the LSONREF signal 448, the comparator 442 drives the LSON output LOW. This, in turn, causes associated control logic to force the GDN output 406 to its fully OFF condition by setting the LOCK DN input HIGH.

Similar circumstances occur during a transition from the stable OFF condition to a stable ON condition, such as when the DN input 402 switches from LOW to HIGH. Initially, the predriver operates in an operating mode in which the biasing network 420 pulls the GDN output 406 from its fully OFF (or LOW) condition toward HIGH at a slow rate. This mode facilitates slew rate control. It is to be appreciated that such slew rate control and slow transition rate can vary according to the direction of the current through the associated load and/or whether any slew rate control has been performed by another predriver (e.g., the high side predriver of FIG. 7) during a related transition in the GDN output 406. The predriver 400 switches to a next transitional operating mode, such when the comparator 432 determines that the GUP output is above the level of the LSSATREF signal. In the next transitional operating mode, the biasing network 420 pulls the GDN output 406 HIGH at a faster rate. After the GDN output 306 reaches its stable HIGH level, the biasing network 420 also reduces the current that is used to pull GUP HIGH so as to conserve power.

Similar to the high side predriver 300 of FIG. 7, the predriver 400 arrangement of FIG. 8 also provides for monitoring of its functional condition and components by a test module 450 programmed and/or configured to test various features. In order to selectively control operation of the predriver 400, the predriver includes test inputs, including, for example, a TEN DN input 452, an a SLP/WAK Z10 input 454, and a SLP/WAK 10Z input 456. Various testing and monitoring functionality can be performed via a TST input/output 458.

Figure 9:
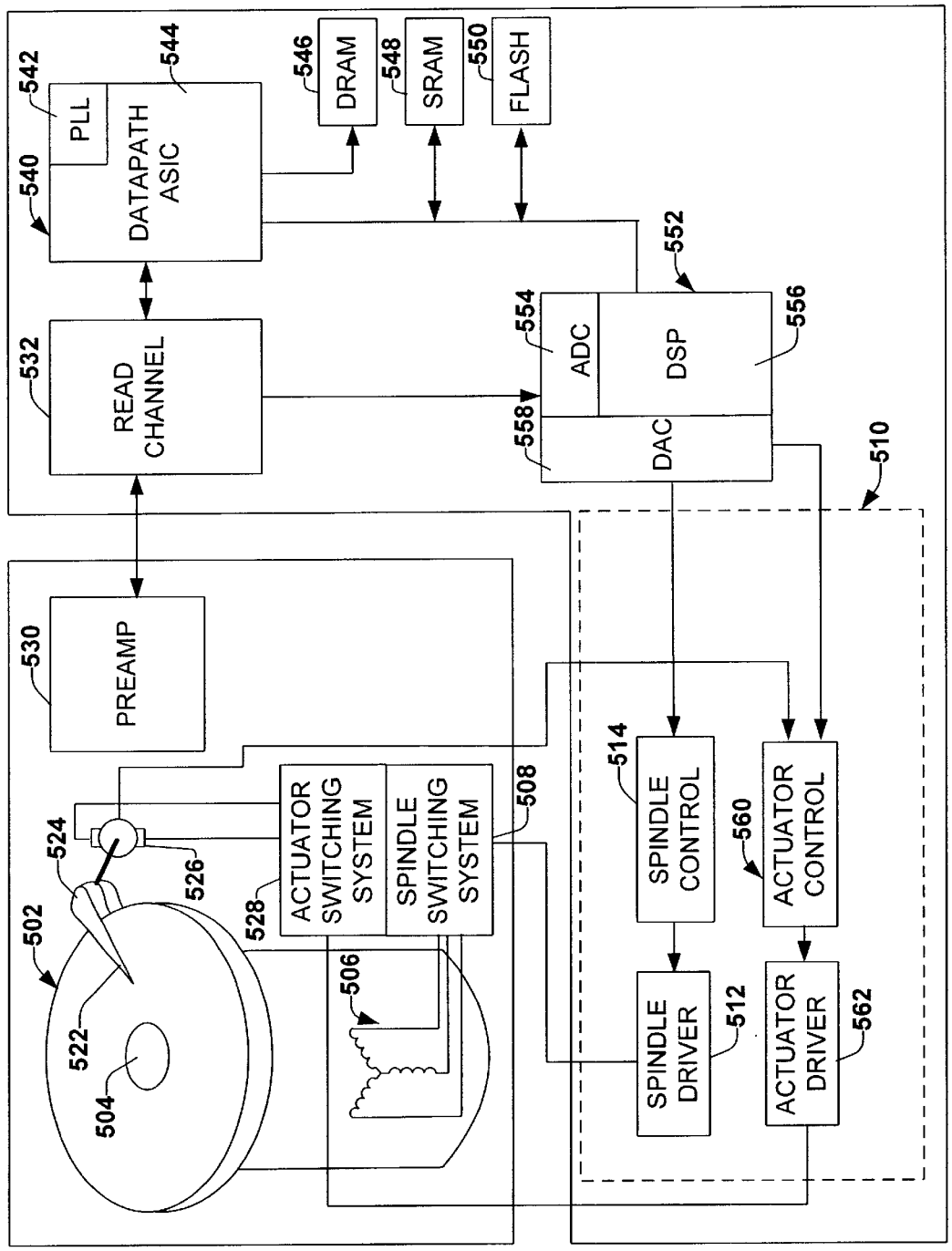
FIG. 9 is an example of a disk drive system implementing a driver system in accordance with an aspect of the present invention.

FIG. 9 illustrates an overall block diagram of a hard disk drive system 500, which is programmed and/or configured to implement a driver system and/or methodology in accordance with an aspect of the present invention. Briefly stated, the hard disk drive system 500 includes a plurality of disks 502 mounted on a rotatable spindle, schematically indicated at 504. A three phase spindle motor 506 is operatively connected to the spindle 504 so as to rotate the disks 502 when the motor is energized. A switching system 508, such an array of power MOSFET (metal oxide semiconductor field effect transistors) devices (erg, two FETs per motor winding) are selectively activated and deactivated to energize the motor 506 for rotating the disks 502. Each disk 502, for example, has a magnetic recording surfaces on both sides of the disk, as is known in the art.

One or more motor control systems 510 are programmed and/or configured to control operation of the switching system 508 to effect desired operation of the motor 506. The motor control system 510, which may be implemented as one or more integrated circuits on one or more chips, includes a spindle driver 512 that receives control signals from a spindle control system 514. The spindle driver 512 includes highside and low-side predrivers for each phase of the motor 506. The spindle driver is programmed and configured to implement desired switching of the switch devices of the switching system 508 in accordance with an aspect of the present invention. That is, each predriver is operative to implement two more transitional operating modes during a change between generally stable ON and OFF operating conditions, as described herein. For example, each transitional operating mode can cause the output to change at a different desired rate. The operation of the respective predrivers is control based on logic control signals from the spindle control 514, also as indicated herein. The control from the spindle control 514, for example, results in desired pulse-width-modulation of the switch devices of the switching system.

The spindle control block 514 thus provides an output signal to the spindle driver block 512, which, in turn, produces appropriate output signals for selectively activating and deactivating switch devices of the spindle switching system 508 so as to energize each phase of the spindle motor 506 in a desired manner. The output signals switch the respective switch devices of the switching system 508 in synchronization with the rotation of the spindle motor 506 so as to provide the desired torque to the spindle motor. Appropriate sensing circuitry may be employed to facilitate control of the spindle motor 506. By way of example, in a run mode, the desired torque is in the direction of rotation of the spindle motor, while in a brake mode the desired torque is in the opposite direction.

By way of further illustration, fly back diodes (not shown) can be operatively connected across each of the switch devices of the spindle switching system 508 for rectifying current generated by the back EMF of the spindle motor 506. It is to be appreciated, however, that the control methodology implemented by the driver 512 in accordance with an aspect of the present invention mitigates flyback.

The system 500 also includes a read/write head 522 mounted on an actuator arm 524, which is moved radially by an actuator motor 526. The actuator motor 526 is energized by another switching system 528, such as may include an array of power FETs. The actuator switching system 528 is selectively controlled, such as based on a current (or voltage) command signal. It is to be appreciated that typically the actuator motor 526 is employed to move a plurality of support arms in unison, such as to move each associated read/write head radially relative to a respective disk.

The read head 522 detects magnetic flux changes on the surfaces of the disks 502. Each flux change produces a signal that is read by a pre-amplifier 530. The preamplifier 530 transmits the signal to a read channel 532, which decodes and otherwise processes the signal in a manner known in the art. The read channel 532 sends the decoded data to an associated control block 540, which may include a phase-locked loop 542. The phase-locked loop 542 communicates with the read channel 532 to ensure that the data is read from the disk(s) 502 with proper synchronization. The control block 540 also includes an application-specific integrated circuit (ASIC) 544, which processes the decoded data. The ASIC 544 further communicates with the read channel 532, a dynamic RAM unit 546, a static RAM unit 548, a flash memory unit 550, and a digital signal processing block 552.

The read channel 532 sends the decoded data in analog form to the digital signal processing (DSP) block 552. By way of example, the DSP block 552 includes an analog to-digital converter (ADC) 554, digital signal processing (DSP) circuitry 556, and a digital-to-analog converter (DAC) 558. The digital signal processing block 552 sends signals to the motor control system 510.

The spindle control 514 also receives input signals from the DAC 558 for controlling operation of the spindle motor 506. The input signals may select a desired running mode of the spindle motor, such as startup, run, coast, and brake, with desired multi-zone control implemented between generally stable operating conditions so as to improve efficiency and performance of the switching system 508 and the motor 506. The spindle control block 514 provides an output signal to the spindle driver 512 which, in turn provides a voltage (or current) command signal to the spindle FETs for controlling energization of the spindle motor 506. The spindle control block 514 may control the current driving the spindle motor 506, for example, by desired pulse width modulation.

In addition to the spindle motor controls 512 and 514, the motor control system 510 includes an actuator control block 560 for controlling operation of the actuator motor 526. The actuator control block 560, for example, provides a control signal to an associated actuator driver circuit 562, which may include one or more power amplifiers and/or driver circuitry. The actuator driver 562 provides a voltage or current command signal to the actuator switching system 528 for selectively activating and deactivating the FETs to provide a desired amount of electrical energy to the actuator motor 526. One or more conditions (e.g., voltage, current, etc.) of the actuator motor 26 may be sensed, indicated schematically by line 564 to facilitate motor control.

Figure 10:
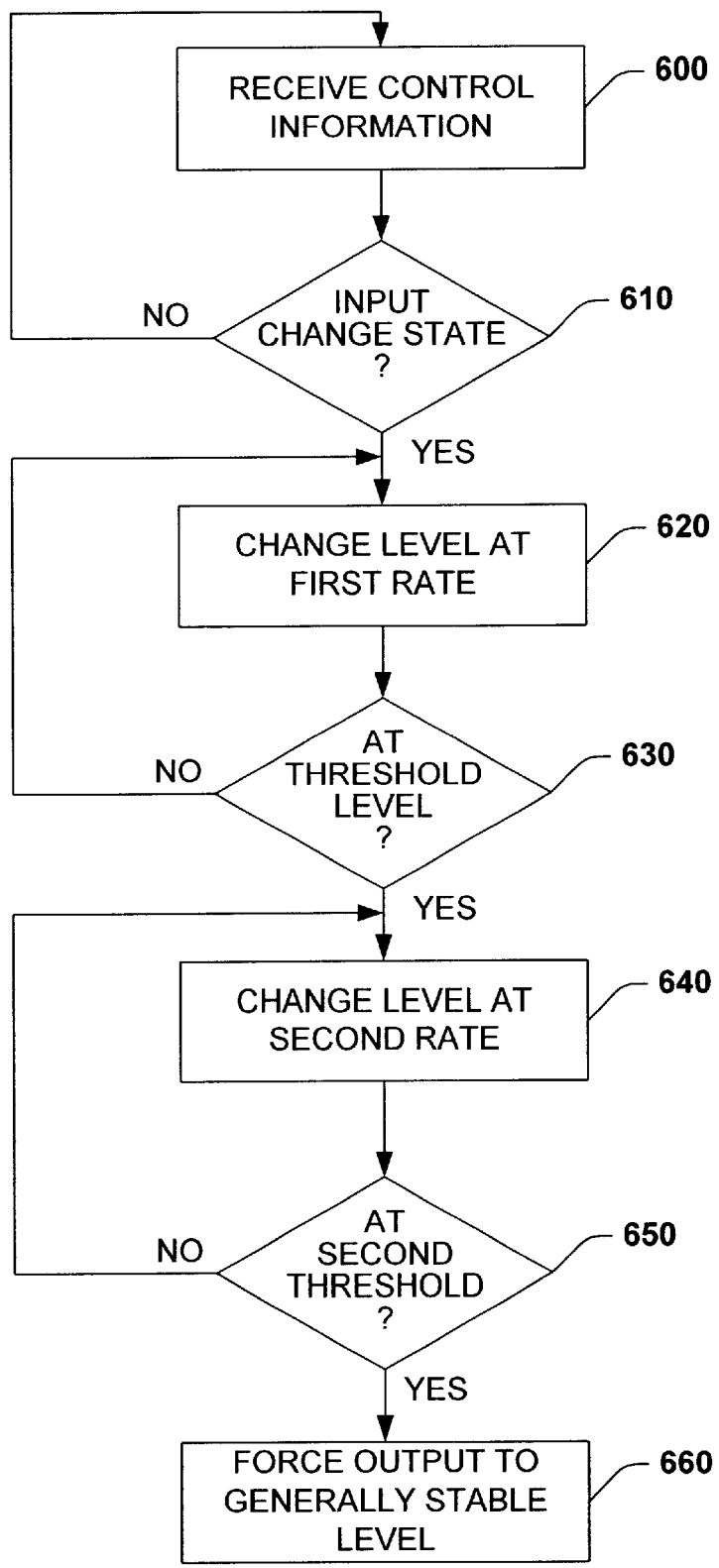
FIG. 10 is a flow diagram illustrating a methodology for driving an output to a LOW condition in accordance with an aspect of the present invention.
Figure 11:
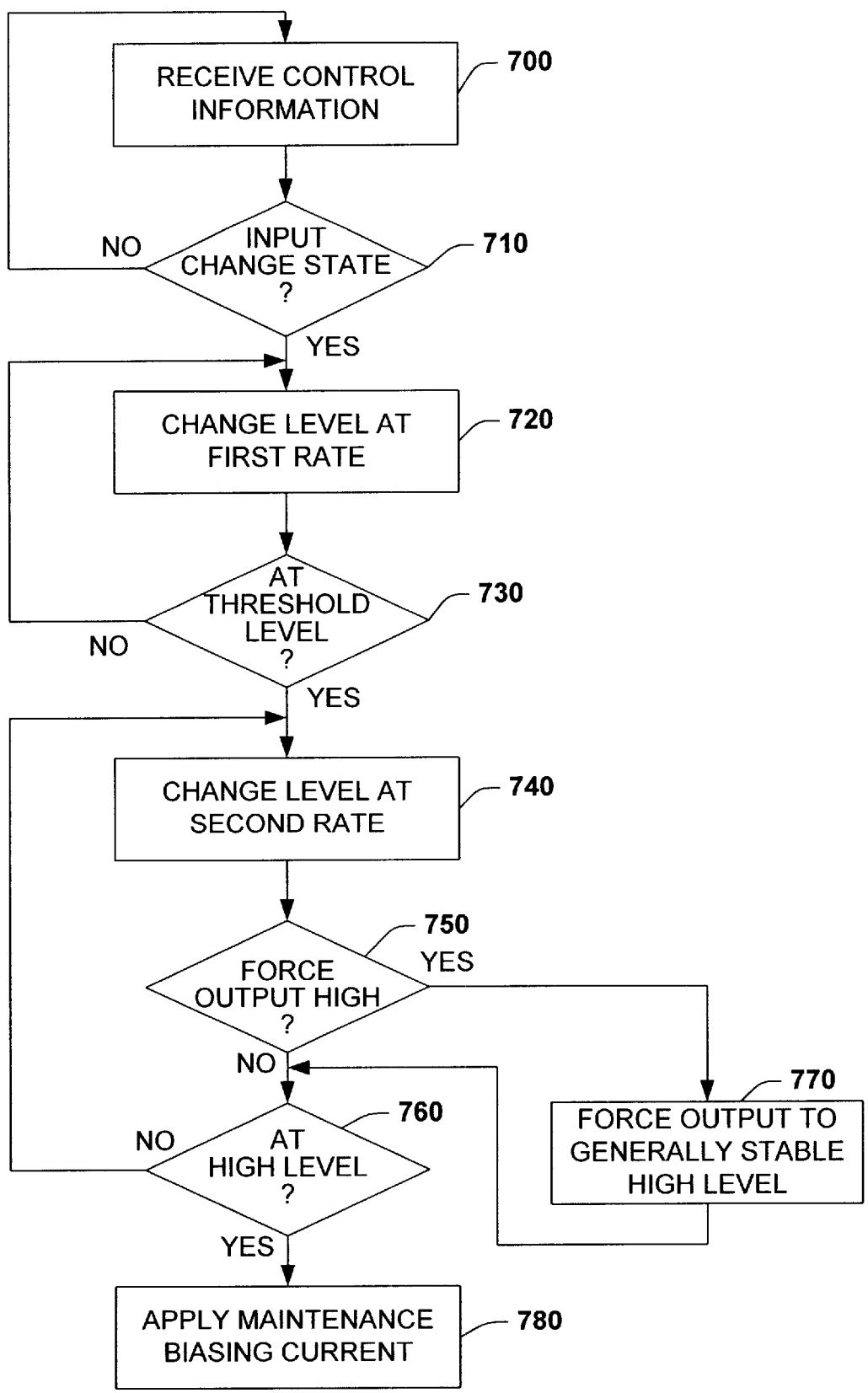
FIG. 11 is a flow diagram illustrating a methodology for driving output to a HIGH condition in accordance with an aspect of the present invention.

In view of the foregoing structural and functional features described above, methodologies in accordance with various aspects of the present invention will be better appreciated with reference to FIGS. 10 and 11. While, for purposes of simplicity of explanation, the methodologies of FIGS. 10 and 11 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is to be understood that the following methodologies can be implemented in hardware, integrated circuits, software, or a combination thereof.

FIG. 10 is a flow diagram illustrating a methodology that can be used for providing an output signal to control a switch device. In FIG. 10, the flow diagram illustrates an example in which control is implemented to change the output signal from a generally stable HIGH to a generally stable LOW condition. For example, the switch device may be one of a pair of switches coupled across a load, such as a phase of a motor (e.g., a spindle motor) winding. The methodology begins at 600 in which control information, such as from associated control logic is received. The control information can include information identifying a desired state of the associated switch and/or information used for clamping the output signal to a selected one of its generally stable operating levels.

Next, at 610, a determination is made as to whether received control information indicates to initiate a change in its output condition, namely from a HIGH level to a LOW level. If a determination at 610 is negative, the methodology returns to 610 and repeats accordingly. In the event that the input indicates to change the output from its HIGH to its LOW level, the methodology proceeds to 620. At 620, control is implemented to change the level of the output signal at a first rate. For example, the initial rate can cause the level of the output signal to pull low at a desired rapid rate. This rate may be programmable and optimized so as to minimize the delay associated with this switch device.

Next at 630, a determination is made as to whether the output level is at or below a predetermined reference threshold. The threshold, for example, is a saturation threshold indicating resistive function of the associated switch device. If the threshold is not yet reached, the methodology returns to 620 in which it continues to change the output at the associated rate. Once the output level reaches (or falls below) the threshold, the methodology proceeds to 640. At 640, control is implemented to change the output signal at a second rate. The second rate, for example, is lower rate than at 620. This rate also may be programmed and optimized to implement desired slew rate control for the associated switch device. The rates of change at 620 and/or 640 can be linear or nonlinear with respect to time.

Next at 650, a determination is made as to whether the output level has reached or fallen below a low reference threshold, which indicates for practical purposes that the associated switch device is fully OFF. If the determination at 650 is negative, the methodology continues with the output signal being pulled LOW according to the rate set at 640. Once the level of the output signal reaches or falls below the second threshold, the methodology proceeds to 660, in which the output signal is forced to its generally stable LOW level, such as ground potential, which helps minimize flyback time. The output signal can remain at the LOW level until control information indicates to return to the generally stable HIGH level.

FIG. 11 is a flow diagram illustrating a methodology that can be used for controlling an output signal to change from a generally stable LOW level to a generally stable HIGH level in accordance with an aspect of the present invention. The methodology begins at 700 in which control information is received. Next, at 710, a determination is made as to whether received control information indicates to initiate a change in its output condition, namely from a HIGH level to a low level. If a determination at 710 is negative, the methodology continues monitoring the received control information. In the event that the input indicates a change from its LOW to its HIGH level, the methodology proceeds to 720.

At 720, control is implemented to change the level of the output signal at a first rate. For example, the initial rate can pull the output signal HIGH at a desired slow rate. The second rate may be programmed (or otherwise set) to implement desired slew rate control for the associated switch device.

Next at 730, a determination is made as to whether the output level is at or below a predetermined reference threshold. The threshold, for example, is a saturation threshold indicating resistive function of the associated switch device. The threshold can be the same or different threshold than that associated with 630 in the methodology of FIG. 10. If the threshold is not yet reached, the methodology continues comparing the output signal relative to the threshold at 730. Once the output level reaches (or rises above) the threshold, the methodology proceeds to 740. At 740, control is implemented to change the output signal at a second rate, which is higher than the rate associated with 720. This rate may be programmable and optimized so as to minimize the delay associated with this switch device. The rates at which the output signal changes at 720 and/or 740 can be fixed or variable with respect to time.

Next at 750, a determination is made as to whether the output signal should be forced to its HIGH level. The determination, for example, can be based on control information received from an associated control system and/or internal controls. If the determination at 750 is negative, the methodology proceeds to 760. At 760 a determination is made as to whether the output signal has reached its desired HIGH level. If the output signal has not reached its HIGH (generally stable) level, the methodology returns to 740 in which the output signal is continued to be pulled high at the second rate.

If the determination at 760 is affirmative, indicating that the output signal is to be forced HIGH, the methodology proceeds to 770. At 770, the output signal is forced to its generally stable HIGH level. From 770, the methodology proceeds to 760.

If the determination at 760 is affirmative, indicating that the output signal is at its generally stable HIGH level, the methodology proceeds to 780. At 780, a maintenance biasing current is applied for controlling operation of the associated switch device during the stable operating condition. The maintenance biasing current is at a reduced level than compared to the current used to control the output signal during its transition from LOW to HIGH levels. As a result, power in a system employing this methodology can be conserved. The output signal can remain in its HIGH level (by applying the maintenance current) until control information is provided to cause it to change to its generally stable LOW level, such as shown and described with respect to FIG. 10.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A predriver for switching applications, comprising:
    an input operative to receive control information for initiating a change in an output signal of the predriver from a first generally stable condition to a second generally stable condition;
    an output control operative to provide the output signal for controlling an associated switch device based on the control information;
    the output control causing the output signal to implement at least two transitional modes during the change in the output signal, and
    a comparator that compares the output signal relative to a threshold value and causes the output control to switch from a first of the at least two transitional modes to a second of the at least two transitional modes.

2. The predriver of claim 1, the output signal changing at a different rate in each of the at least two transitional modes.

3. The predriver of claim 2, the output control controlling the output signal to change rapidly in a first of the at least two transitional modes so as to mitigate at least one of flyback and propagation delay associated with a state change of the associated switch device.

4. The predriver of claim 3, the change in the output signal further including a first change from HIGH to LOW and a second change from LOW to HIGH based on the control information, the output control causing the output signal to implement at least two transitional modes during each of the first and second changes in the output signal, at least one of the transitional modes during each of the first and second changes causing the output signal to change at a rapid rate so as to mitigate propagation delay differences during the first and second changes in the output signal.

5. The predriver of claim 3, the output control controlling the output signal to change at rate in a second of the at least two transitional modes, which is slower than in the first transitional mode, so as to provide slew rate control.

6. The predriver of claim 5, the change in the output signal further including a first change from HIGH to LOW and a second change from LOW to HIGH based on the control information, the output control causing the output signal to implement at least two transitional modes during each of the first and second changes in the output signal, the control output further controlling one of the transitional modes associated with each of the first and second changes to substantially match rising and falling slew rates during the first and second changes.

7. The predriver of claim 2, the output control being programmable to set a desired rate at which the output signal changes during at least one of the at least two transitional modes.

8. A predriver for switching applications, comprising:
an input operative to receive control information for initiating a change in an output signal of the predriver from a first generally stable condition to a second generally stable condition;
an output control operative to provide the output signal for controlling an associated switch device based on the control information;
the output control causing the output signal to implement at least two transitional modes during the change in the output signal, and
a biasing network operative to apply a reduced biasing current after entering a second of the generally stable condition so as to maintain the output signal in the second generally stable condition and reduce power consumption.

9. The predriver of claim 1, the output control being coupled to a control input of a switch device, the output signal controlling operation of the switch device to mitigate flyback and provide slew rate control.

10. The predriver of claim 1 in combination with a control system, the combination further comprising:
the predriver defining a first predriver and the control information provided to the first predriver defining first control information;
a second predriver having an input operative to receive second control information for initiating a change in an output signal thereof from a first generally stable condition to a second generally stable condition;
an output control operatively associated with the second predriver to provide an output signal from the second predriver that implements at least two transitional modes during the change in the output signal of the second predriver; and
the control system being operative to provide first and second control information to the respective first and second predrivers to effect desired changes in the output signals of each of the first and second predrivers.

11. The combination of claim 10, the control system being operative to provide the first and second control information to mitigate shoot through current associated with the first and second predrivers.

12. A system for driving associated switches, comprising:
a control system that provides first and second control information to set desired operating states of associated first and second switch devices;
a first predriver operative to provide a first output signal that varies between first and second generally stable conditions based on the first control information;
a second predriver operative to provide a second output signal that varies between first and second generally stable conditions based on the second control information;
at least one of the first and second predrivers being operative to control the output signal thereof in at least two different transitional operating conditions during a change in the output signal thereof from the first generally stable condition to the second generally stable condition, and
a comparator that compares the output signal of the at least one of the first and second predrivers relative to a reference level to determine when to change from a first of the at least two transitional operating conditions to a second of the at least two transitional operating conditions.

13. The system of claim 12, the at least one of the first and second predrivers further comprising control circuitry operative to control a rate at which the output signal thereof changes in each of the at least two transitional operating conditions.

14. The system of claim 13, the control circuitry being configured to control the output signal to change rapidly in a first of the at least two transitional operating conditions so as to mitigate at least one of flyback and propagation delay associated with a state change of the associated first and second switch devices.

15. The system of claim 14, the change in the output signal further comprising a first change from HIGH to LOW and a second change from LOW to HIGH, the at least one of the first and second predrivers causing the output signal thereof to implement at least two transitional modes during each of the first and second changes in the output signal, at least one of the transitional modes during each of the first and second changes causing the output signal to change at a rapid rate so as to mitigate propagation delay differences during the first and second changes in the output signal.

16. The system of claim 14, the control circuitry being configured to control the output signal to change at rate in a second of the at least two transitional operating conditions that is slower than in the first transitional operating conditions so as to provide slew rate control.

17. The system of claim 13, the control circuitry being configured to control the output signal to change more slowly in a first of the at least two transitional operating conditions so as to provide slew rate control.

18. The system of claim 12, the change in the output signal further including a first change from HIGH to LOW and a second change from LOW to HIGH depending on respective control information, the at least one of the first and second predrivers causing the output signal to implement at least two transitional modes during each of the first and second changes in the output signal, the control output further controlling one of the transitional modes associated with each of the first and second changes to substantially match rising and falling slew rates during the first and second changes.

19. A system for driving associated switches, comprising:
a control system that provides first and second control information to set desired operating states of associated first and second switch devices;
a first predriver operative to provide a first output signal that varies between first and second generally stable conditions based on the first control information; and
a second predriver operative to provide a second output signal that varies between first and second generally stable conditions based on the second control information;
at least one of the first and second predrivers being operative to control the output signal thereof in at least two different transitional operating conditions during a change in the output signal thereof from the first generally stable condition to the second generally stable condition, and
wherein each of the first and second predrivers further comprising a biasing network operative to apply a reduced biasing current after entering one of the first and second generally stable conditions associated with a higher potential energy so as to maintain the output signal in the second generally stable condition and reduce power consumption.

20. The system of claim 12, the first generally stable operating condition corresponding to one of HIGH and LOW and the second generally stable operating condition corresponding to the other of HIGH and LOW.

21. The system of claim 12 in combination with a switching system operative to drive a load, the combination further comprising:
the switching system comprising first and second switch devices operatively coupled across the load;
the first predriver providing the first output signal to control the first switch device; and
the second predriver providing the second output signal to control the second switch device.

22. The combination of claim 21, the load comprising a phase of an electric motor.

23. The combination of claim 22, the electric motor comprising a spindle motor of a disk drive system.

24. A system to facilitate operation of a motor having a plurality of phases, comprising:
a switching system comprising a plurality of pairs of switch devices, each pair of switch devices being connected across an associated phase of the motor;
a plurality of first predrivers, each of the first predrivers being operative to provide a first output signal to control one switch device of each respective switch device pair;
a plurality of second predrivers, each of the second predrivers being operative to provide a second output signal to control another switch device of each respective switch device pair;
at least some of the first and second predrivers being operative to control the output signal thereof in at least two different transitional operating conditions during a change in the output signal thereof from a first generally stable operating condition to a second generally stable operating condition,
wherein each of the at least some of the first and second predrivers further comprising a comparator that compares the output signal thereof relative to respective reference level to change the output signal thereof from a first of the at least two transitional operating conditions to a second of the at least two transitional operating conditions during a change in the output signal thereof from a first generally stable operating condition to a second generally stable operating condition.

25. The system of claim 24, the first generally stable operating condition corresponding to one of HIGH and LOW and the second generally stable operating condition corresponding to the other of HIGH and LOW.

26. The system of claim 24, further comprising a control system operative to provide control information to each of the first and second predrivers for initiating changes between the first and second generally stable operating conditions of the respective output signals to effect desired activation and deactivation of the switch devices.

27. The system of claim 24 each of the at least some of the first and second predrivers further comprising an output control portion operative to control a rate at which the output signal thereof changes in each of the at least two transitional operating conditions.

28. The system of claim 27, the output control portion of each of the at least some of the first and second predrivers controlling the output signal thereof to change rapidly in a first of the at least two transitional operating conditions so as to mitigate flyback.

29. The system of claim 27, the output control portion of each of the at least some of the first and second predrivers controlling the output signal thereof to change at a rate in a second of the at least two transitional operating conditions that is slower than in the first transitional operating condition so as to provide slew rate control.

30. A system to facilitate operation of a motor having a plurality of phases, comprising:
a switching system comprising a plurality of pairs of switch devices, each pair of switch devices being connected across an associated phase of the motor;
a plurality of first predrivers, each of the first predrivers being operative to provide a first output signal to control one switch device of each respective switch device pair;
a plurality of second predrivers, each of the second predrivers being operative to provide a second output signal to control another switch device of each respective switch device pair;
at least some of the first and second predrivers being operative to control the output signal-thereof in at least two different transitional operating conditions during a change in the output signal thereof from a first generally stable operating condition to a second generally stable operating condition,
wherein each of the first and second predrivers further comprising a biasing network operative to apply a reduced biasing current after entering one of the first and second generally stable conditions associated with a higher potential energy so as to maintain the output signal in the second generally stable condition and reduce power consumption.

31. The system of claim 24, the change in the output signal further including a first change from HIGH to LOW and a second change from LOW to HIGH depending on control information received by the at least some of the first and second predrivers, the at least one of the first and second predrivers further comprising control circuitry to cause the output signal to implement at least two transitional modes during each of the first and second changes in the output signal, such that a related one of the transitional modes associated with each of the first and second changes are substantially matched.

32. A method for controlling an associated switch device, comprising:
providing an output signal at one of first and second generally stable operating levels for operating the switch device in one of first and second states;
initiating a change in the output signal from the one of first and second generally stable levels to another generally stable level;
controlling the output signal to change according to at least two different rates during the change in the output signal, and
reducing to a biasing current after transitioning to a higher one of the generally stable levels.

33. A method for controlling an associated switch device, comprising:
providing an output signal at one of first and second generally stable operating levels for operating the switch device in one of first and second states;
initiating a change in the output signal from the one of first and second generally stable levels to another generally stable level;
controlling the output signal to change according to at least two different rates during the change in the output signal, and
comparing the output signal relative to a threshold and controlling at which of the at least two different rates to change the output signal during the change in the output signal based on the comparison.

* * * * *